(12) United States Patent
Toda et al.

(10) Patent No.: US 8,514,879 B2
(45) Date of Patent: Aug. 20, 2013

(54) WIRELESS COMMUNICATION BASE STATION DEVICE AND CQI REPORT METHOD

(75) Inventors: Takashi Toda, Ishikawa (JP); Akihiko Nishio, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 13/043,332

(22) Filed: Mar. 8, 2011

(65) Prior Publication Data
US 2011/0158195 A1    Jun. 30, 2011

Related U.S. Application Data

(63) Continuation of application No. 12/064,045, filed as application No. PCT/JP2006/316219 on Aug. 18, 2006, now Pat. No. 7,933,287.

(30) Foreign Application Priority Data

Aug. 19, 2005   (JP) ................................ 2005-238953

(51) Int. Cl.
*H04J 3/16*   (2006.01)

(52) U.S. Cl.
USPC ........................... 370/437; 370/208; 370/468

(58) Field of Classification Search
USPC ................ 370/437, 203, 208, 238, 343, 344, 370/468
See application file for complete search history.

(56) References Cited

U.S. PATENT DOCUMENTS

| | | | |
|---|---|---|---|
| 7,359,327 B2 | 4/2008 | Oshiba | 370/235 |
| 2004/0022213 A1 | 2/2004 | Choi et al. | 370/332 |
| 2004/0203476 A1 | 10/2004 | Liu | 455/69 |
| 2005/0025039 A1 | 2/2005 | Hwang et al. | 370/206 |
| 2005/0128993 A1 | 6/2005 | Yu et al. | 370/342 |
| 2005/0180374 A1 | 8/2005 | Balachandran et al. | 370/343 |
| 2005/0191965 A1* | 9/2005 | Yu et al. | 455/67.16 |
| 2005/0201474 A1 | 9/2005 | Cho et al. | 375/260 |
| 2006/0008020 A1 | 1/2006 | Blankenship et al. | 375/261 |

(Continued)

FOREIGN PATENT DOCUMENTS
CN    1533105        9/2004
EP    1 533 966 A2   5/2005

(Continued)

OTHER PUBLICATIONS

European Search Report, for corresponding European Application No. 06796530.1, dated Nov. 7, 2011, 6 pages.

(Continued)

*Primary Examiner* — Luat Phung
(74) *Attorney, Agent, or Firm* — Seed IP Law Group PLLC

(57) ABSTRACT

Provided is a wireless communication mobile station device by which a throughput can be improved in multicarrier communication. In the device, a group control section (107) controls a subcarrier group, of which CQI is to be reported, among a plurality of subcarrier groups to periodically change, by following pattern information. For instance, the group control section (107) changes the subcarrier group whose CQI is to be reported, by frame or TTI (Transmission Time Interval). Furthermore, the group control section (107) specifies the subcarrier group whose CQI is to be reported, to an SINR detecting section (108) and a CQI generating section (109).

11 Claims, 6 Drawing Sheets

(56) References Cited

U.S. PATENT DOCUMENTS

2006/0039318 A1 2/2006 Oh et al. ............... 370/328
2007/0026808 A1 2/2007 Love et al. ............ 455/67.7
2007/0026810 A1* 2/2007 Love et al. ............ 455/67.11

FOREIGN PATENT DOCUMENTS

| JP | 2004-135305 | 4/2004 |
|----|-------------|--------|
| JP | 2006-50545 | 2/2006 |
| WO | 2004/042982 | 5/2004 |
| WO | 2005/074312 A1 | 8/2005 |

OTHER PUBLICATIONS

Extended European Search Report, for corresponding European Application No. 11174842.2, dated Nov. 7, 2011, 7 pages.
Lucent, "Variable Rate Channel Quality Indication," R1-02-0935, 3GPP TSG-RAN WG 1 Meeting #27, Oulu, Finland, Jul. 2-5, 2002, 4 pages.
Philips, "CQI reporting in DL Compressed Mode," R1-030844, Agenda Item 5.3, 3GPP TSG RAN WG1#33, New York, USA, Aug. 25-29, 2003, 4 pages.
Chinese Office Action mailed Oct. 9, 2010 in corresponding Chinese Application No. 200680030111.0, 4 pages.
3GPP TSG RAN WG1 Ad Hoc on LTE, "Downlink Channelization and Multiplexing for EUTRA," R1-050604, Sophia Antipolis, France, Jun. 20-21, 2005, pp. 1-9.
3GPP TSG RAN WG1 Ad Hoc on LTE, "Physical Channels and Multiplexing in Evolved UTRA Downlink," R1-050590, Sophia Antipolis, France, Jun. 20-21, 2005, pp. 1-24.
International Search Report dated Nov. 7, 2006.

* cited by examiner

| SINR | CQI | MCS | TRANSMISSION BITS PER FRAME |
|---|---|---|---|
| A ≦ SINR | 6 | 64QAM, R=3/4 | 13500 |
| B ≦ SINR < A | 5 | 16QAM, R=3/4 | 9000 |
| C ≦ SINR < B | 4 | 16QAM, R=1/2 | 6000 |
| D ≦ SINR < C | 3 | QPSK, R=3/4 | 4500 |
| E ≦ SINR < D | 2 | QPSK, R=1/2 | 3000 |
| SINR < E | 1 | QPSK, R=1/3 | 2000 |

FIG.3

WIRELESS COMMUNICATION BASE STATION DEVICE AND CQI REPORT METHOD

TECHNICAL FIELD

The present invention relates to a radio communication mobile station apparatus, a radio communication base station apparatus and a CQI reporting method.

BACKGROUND ART

In the field of mobile communication, a variety of information such as image and data in addition to voice becomes transmission targets in recent years. Accompanying this, the demand for higher reliability and high-speed transmission has increased. However, when high-speed transmission is carried out in mobile communications, influence of delayed waves due to multipath cannot be ignored, and so transmission performances deteriorate due to frequency selective fading.

As one of countermeasure techniques for frequency selective fading, multicarrier communication represented by the OFDM (Orthogonal Frequency Division Multiplexing) scheme becomes a focus of attention. A multicarrier communication is a technique of carrying out high-speed transmission by transmitting data using a plurality of subcarriers of which transmission speed are suppressed to an extent that frequency selective fading is not generated. Particularly, in the OFDM scheme, frequencies of a plurality of subcarriers where data is allocated are orthogonal to each other, so that it is possible to achieve optimal frequency efficiency in multicarrier communication schemes and realize the OFDM scheme in a relatively simple hardware configuration. Consequently, the OFDM scheme is focused upon as a communication method for use for a cellular-based mobile communication system, and is studied in various ways.

Studies are conducted for performing frequency scheduling transmission using the OFDM scheme on the downlink (see Non-Patent Document 1). In this frequency scheduling, a radio communication base station apparatus (hereinafter simply "base station") adaptively allocates subcarriers to a radio communication mobile station apparatus (hereinafter simply "mobile station"), based on received quality of each frequency band in each mobile station, so that it is possible to obtain maximal multi-user diversity gain, thereby enabling extremely efficient communication. Such a frequency scheduling transmission scheme is primarily suitable for data transmissions when a mobile station moves at low speed.

Consequently, to perform frequency scheduling, each mobile station needs to report received quality to a base station for every subcarrier or every resource block which bundles a plurality of subcarriers. Normally received quality is reported by CQI (Channel Quality Indicator).

Here, if a mobile station reports CQI's for all subcarriers, uplink resources used for transmitting CQI become enormous, and, consequently, uplink data transmission capacity decreases. Now, a technique is proposed whereby a plurality of subcarriers are divided into a plurality of groups (i.e., a subcarrier group) and each mobile station reports the CQI for only one of subcarrier groups allocated to the mobile station, so that the amount of CQI transmission can be reduced (see Non-Patent Document 2). In addition, a subcarrier group will be abbreviated as a "SC group" in the explanation below.

Non-Patent Document 1: R1-050604 "Downlink Channelization and Multiplexing for EUTRA" 3GPP TSG RAN WG1 Ad Hoc on LTE, Sophia Antipolis, France, 20-21 Jun., 2005.

Non-Patent Document 2: R1-050590 "Physical Channels and Multiplexing in Evolved UTRA Downlink" 3GPP TSG RAN WG1 Ad Hoc on LTE, Sophia Antipolis, France, 20-21 Jun., 2005.

DISCLOSURE OF INVENTION

Problems to be Solved by the Invention

However, with the technique disclosed in non-patent document 2, a mobile station, where received quality of the allocated SC group is low and where channel variation is insignificant because the mobile station does not move or moves at low-speed, is constantly given low priority in frequency scheduling and is less likely to be allocated subcarriers of good received quality, and, as a result, throughput decreases.

Moreover, if subcarriers for the SC group allocated to this low-priority mobile station are allocated to another mobile station of higher priority, it is not possible to allocate subcarriers to this low-priority mobile station in accordance with CQI, and so throughput of the mobile station decreases even further.

It is therefore an object of the present invention to provide a radio communication mobile station apparatus, a radio communication base station apparatus and a CQI reporting method that can improve throughput in multicarrier communications.

Means for Solving the Problem

The radio communication mobile station apparatus of the present invention is a radio communication mobile station apparatus dividing a plurality of subcarriers forming a multicarrier signal into a plurality of groups and reporting a channel quality indicator for the subcarriers on a per group basis, and adopts a configuration including: a control section that performs control of periodically changing a group subject to channel quality indicator reporting amongst the plurality of groups; a generating section that generates a channel quality indicator for the subcarriers belonging to one of the plurality of groups, according to the control; and a transmitting section that transmits the generated channel quality indicator.

Advantageous Effect of the Invention

According to the present invention, throughput can be improved in multicarrier communications.

BRIEF DESCRIPTION OF DRAWINGS

FIG. 3 illustrates a look-up table according to an embodiment of the present invention;

BEST MODE FOR CARRYING OUT THE INVENTION

An embodiment of the present invention will be described below in detail with reference to the accompanying drawings.

Figure 1:
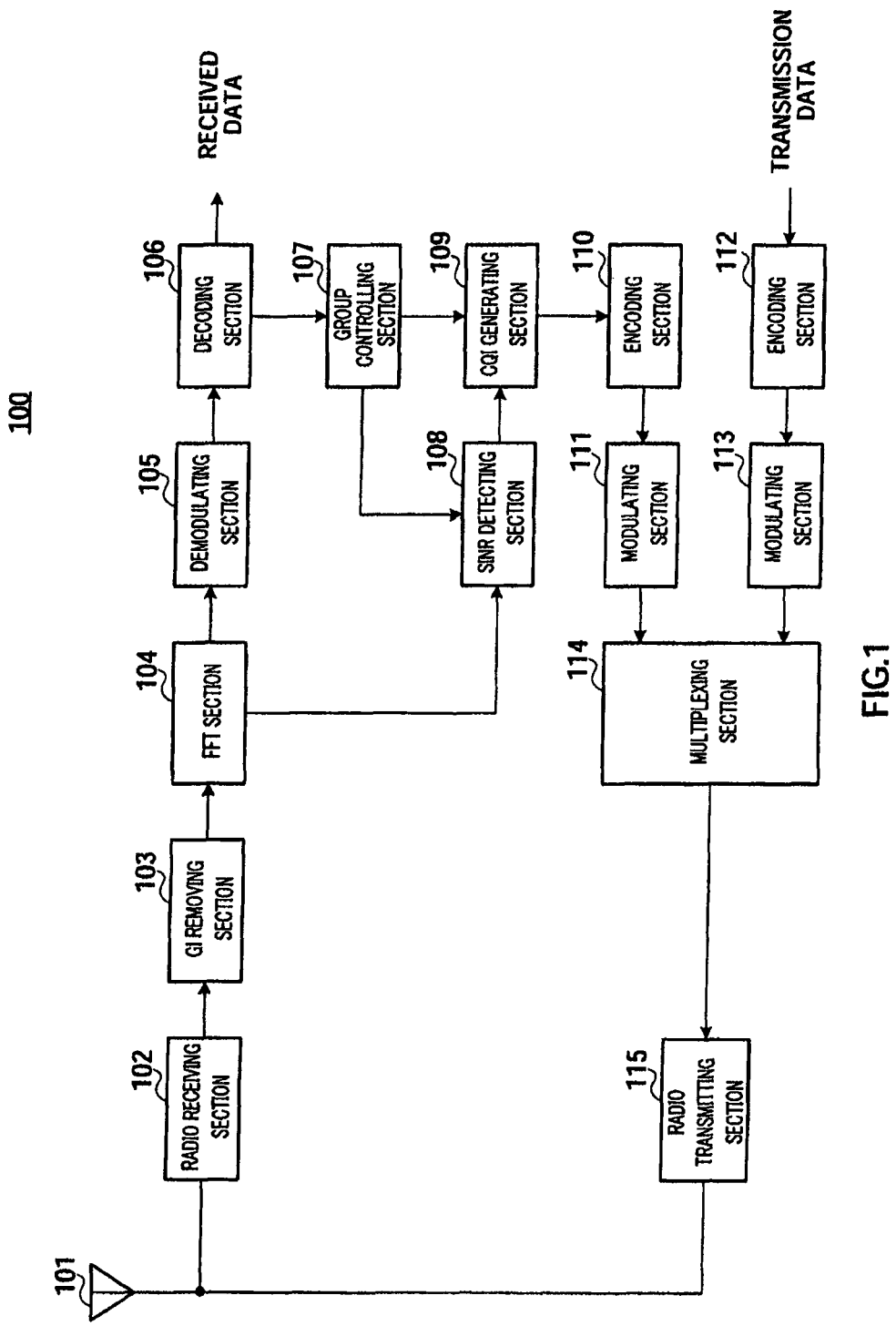
FIG. 1 is a block diagram showing a mobile station according to an embodiment of the present invention.
Figure 2:
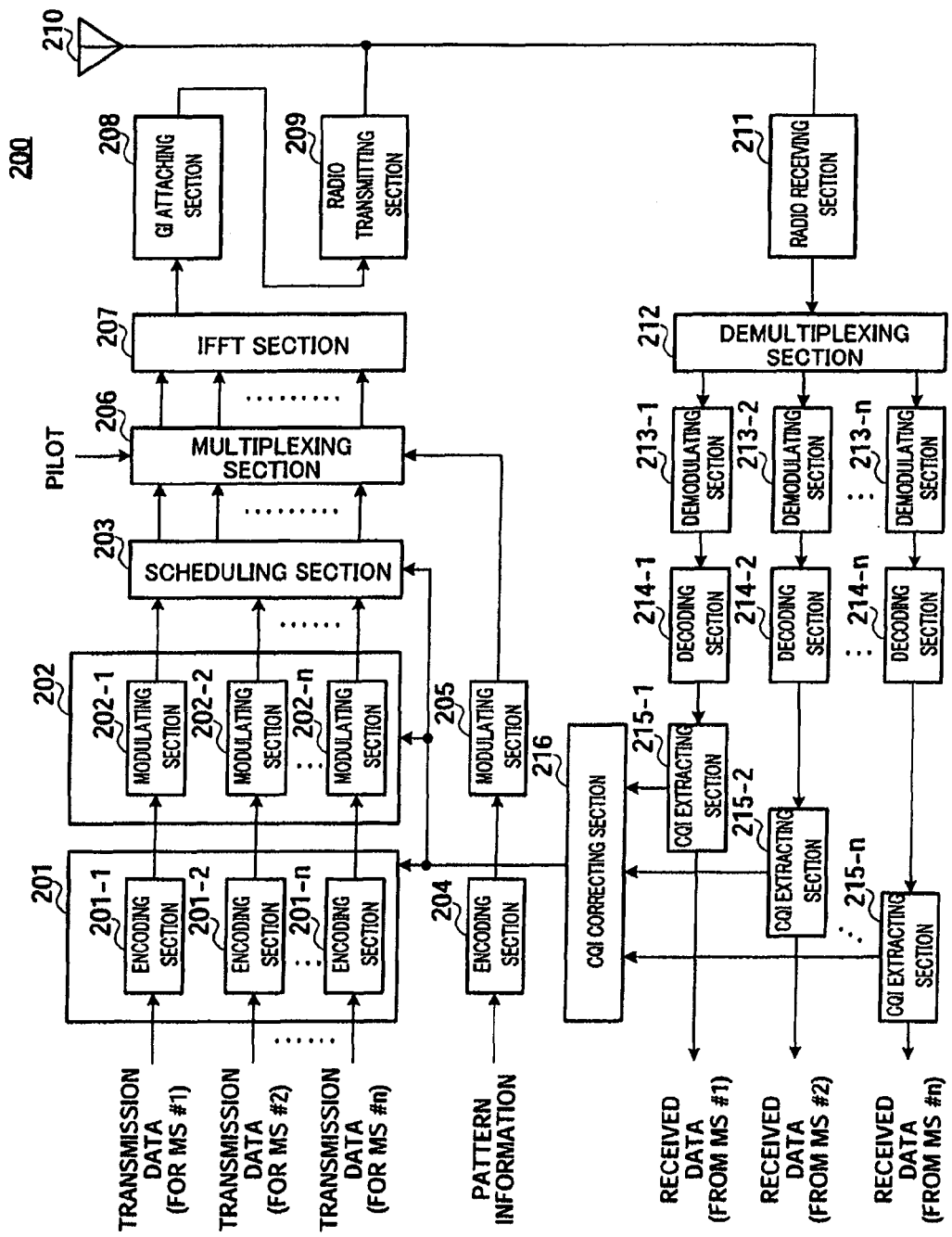
FIG. 2 is a block diagram showing a base station according to an embodiment of the present invention.

FIG. 1 shows the configuration of the mobile station according to the embodiment. Moreover, FIG. 2 shows the configuration of the base station according to the embodiment. Mobile station 100 shown in FIG. 1 divides a plurality of subcarriers forming a multicarrier signal into a plurality of SC groups, and reports the CQI for the subcarriers on a per SC group basis. Base station 200 shown in FIG. 2 performs frequency scheduling based on CQI's reported from a plurality of mobile stations adopting the configuration shown in FIG. 1.

In mobile station 100 shown in FIG. 1, radio receiving section 102 receives an OFDM symbol, which is a multicarrier signal, transmitted from base station 200 shown in FIG. 2, via antenna 101, performs receiving processing such as down-conversion and A/D conversion on the OFDM symbol, and outputs the OFDM symbol after the processing to GI removing section 103.

GI removing section 103 removes the guard interval ("GI") attached to the OFDM symbol, and outputs the OFDM symbol to FFT (Fast Fourier Transform) section 104.

By performing an FFT on the OFDM symbol inputted from GI removing section 103, FFT section 104 converts the OFDM symbol to the frequency domain and acquires the pilot symbols, pattern information and data symbols. The pilot symbols are inputted to SINR detecting section 108, and the pattern information and data symbols are inputted to demodulating section 105. This pattern information shows CQI reporting patterns for a plurality of SC groups.

Demodulating section 105 demodulates the pattern information and data symbols, and decoding section 106 decodes the pattern information and data symbols after the demodulation. In this way, received data is acquired. Moreover, the pattern information after decoding is inputted to group controlling section 107.

According to the pattern information, group controlling section 107 performs control (i.e., SC group control) for periodically changing the group subject to CQI reporting amongst a plurality of SC groups. For example, group controlling section 107 changes the SC group subject to CQI reporting, on a per frame or per TTI (Transmission Time Interval) basis. In this SC group control, group controlling section 107 designates the SC group subject to CQI reporting, to SINR detecting section 108 and CQI generating section 109, on a per frame or per TTI basis. Incidentally, SC group control will be described in detail later.

According to the designation from group controlling section 107, SINR detecting section 108 detects the SINR (Signal to Interference and Noise Ratio) of each subcarrier belonging to the SC group subject to CQI reporting, using the pilot symbols, and outputs the SINR to CQI generating section 109 as received quality of each subcarrier.

CQI generating section 109 has the table shown in FIG. 3, and, according to the designation from group controlling section 107, generates CQI's associated with the SINR of each subcarrier belonging to the SC group subject to CQI reporting, with reference to this table. That is, CQI generating section 109 generates the CQI for each subcarrier belonging to one of a plurality of groups, according to SC group control. For example, for a subcarrier, where SINR is B≦SINR<A, CQI "5" is generated. In addition, CQI "5" corresponds to the MCS (Modulation and coding scheme) of 16 QAM and R=3/4. When CQI is "5," 9000 bits of data can be transmitted per frame. That is, the transmission rate for CQI "5" is 9000 bits per frame. In the threshold values A to E for SINR shown in this table, A is the maximum value and E is the minimum value. That is, with the table shown in FIG. 3, the CQI level increases following improvement of received quality. Moreover, transmission rate increases when the CQI level increases. The generated CQI as such is encoded by encoding section 110, modulated by modulating section 111 and inputted to multiplexing section 114.

On the other hand, transmission data is encoded by encoding section 112, modulated by modulating section 113, and, as a result, data symbols are acquired and inputted to multiplexing section 114.

Multiplexing section 114 time multiplexes the CQI's inputted from modulating section 111 over data symbols inputted from modulating section 113, and outputs the result to radio transmitting section 115. Incidentally, Multiplexing of CQI's is performed on a per frame or per TTI basis. CQI may be frequency multiplexed as well.

Radio transmitting section 115 performs transmission processing such as D/A conversion, amplification and up-conversion on the transmission signal including CQI and data symbols, and transmits the signal to base station 200 shown in FIG. 2 from antenna 101.

On the other hand, in base station 200 shown in FIG. 2, encoding section 201 is comprised of encoding sections 201-1 to 201-$n$. Moreover, encoding sections 201-1 to 201-$n$ are provided to equal "n," which is the maximum number of mobile stations, base station 200 is able to communicate with. Encoding sections 201-1 to 201-$n$ encode transmission data for mobile stations (MS) #1 to #n at coding rates designated by CQI correcting section 216 and output the encoded transmission data to modulating section 202.

Modulating section 202 is comprised of modulating sections 202-1 to 202-$n$. Moreover, modulating sections 202-1 to 202-$n$ are provided to equal "n," which is the maximum number of mobile stations, base station 200 is able to communicate with. Modulating sections 202-1 to 202-$n$ modulate the encoded data inputted from encoding section 201, using modulation schemes designated by CQI correcting section 216, to generate data symbols, and output the data symbols to scheduling section 203.

Based on the corrected CQI inputted from CQI correcting section 216, scheduling section 203 performs frequency scheduling, which adaptively allocates data symbols for each mobile station to subcarriers using scheduling methods such as the maximum CIR method and the proportional fairness method. Data symbols to which the frequency scheduling is applied, are inputted to multiplexing section 206.

Moreover, the pattern information is encoded by encoding section 204, modulated by modulating section 205 and inputted to multiplexing section 206.

Multiplexing section 206 time multiplexes the pilot symbols and the pattern information inputted from modulating section 205 on data symbols inputted from scheduling section 203, and outputs the result to IFFT (Inverse Fast Fourier Transform) section 207. In this way, the pilot symbols, the pattern information or data symbols are allocated to subcarriers. Moreover, pilot symbols are multiplexed on a per frame or per TTI basis. Multiplexing of pattern information is performed when each mobile station starts communication. In addition, multiplexing of pattern information may be performed using frequency multiplexing.

IFFT section 207 performs an IFFT on a plurality of subcarriers to which pilot symbols, pattern information or data symbols are allocated, converts the subcarriers into the time domain to generate an OFDM symbol, which is a multicarrier signal. This OFDM symbol is inputted to GI attaching section 208.

GI attaching section 208 attaches the same signal as the tail part of the OFDM symbol, to the beginning of the OFDM symbol, to provide a guard interval ("GI"), and outputs the OFDM symbol with an attachment of a GI, to radio transmitting section 209.

Radio transmitting section 209 performs transmission processing such as D/A conversion, amplification and up-conversion, on the OFDM symbol with an attachment of a GI, and transmits the result via antenna 210 to mobile station 100 shown in FIG. 1.

On the other hand, radio receiving section 211 receives signals, transmitted from a plurality of mobile stations 200 and including CQI's, via antenna 210, and performs receiving processing such as down-conversion and A/D conversion, on these received signals. The signals after the receiving processing are inputted to demultiplexing section 212.

The signals from mobile stations are received multiplexed using frequency division multiplexing, time division multiplexing, code division multiplexing or using other multiplexing schemes and so demultiplexing section 212 demultiplexes the signal inputted from radio receiving section 211 for each mobile station (MS) #1 to #n, and outputs signals to demodulating sections 213-1 to 213-$n$.

Demodulating sections 213-1 to 213-$n$ and decoding sections 214-1 to 214-$n$ and CQI extracting sections 215-1 to 215-$n$ are each provided to equal "n," which is the maximum number of mobile stations, base station 200 is able to communicate with.

Demodulating sections 213-1 to 213-$n$ demodulate the signals inputted from demultiplexing section 212, and output the demodulated signals to decoding sections 214-1 to 214-$n$.

Decoding sections 214-1 to 214-$n$ decode the signals inputted from demodulating sections 213-1 to 213-$n$, and output the decoded signals to CQI extracting sections 215-1 to 215-$n$.

CQI extracting sections 215-1 to 215-$n$ extract the CQI's from the signals inputted from decoding sections 214-1 to 214-$n$, and output these CQI's to CQI correcting section 216. CQI extracting sections 215-1 to 215-$n$ output signals after CQI's have been extracted, that is, received data for mobile stations (MS) #1 to #n.

CQI correcting section 216 has the table shown in FIG. 3 and corrects CQI's reported from mobile stations over time. This CQI correction will be described in detail later. Then, according to the corrected CQI, CQI correcting section 216 performs adaptive MCS control and designates the coding rate and modulation scheme to encoding section 201 and modulating section 202, and outputs the corrected CQI to scheduling section 203 at the same time.

Next, SC group control in mobile station 100 will be described here in detail.

Figure 4:
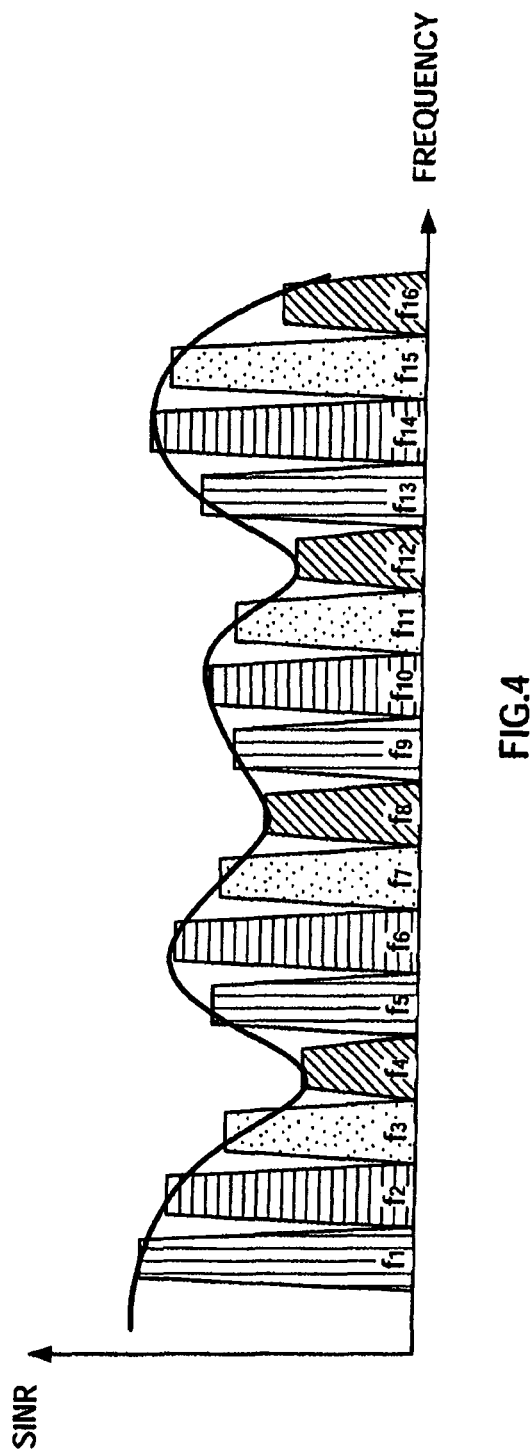
FIG. 4 illustrates an example of SC groups according to an embodiment of the present invention.

For example, when one OFDM symbol is formed with subcarriers $f_1$ to $f_{16}$, with the embodiment, as shown in FIG. 4, subcarriers $f_1$ to $f_{16}$ are divided into four SC groups. That is, subcarriers $f_4$, $f_8$, $f_{12}$ and $f_{16}$ make SC group #1, subcarriers $f_3$, $f_7$, $f_{11}$ and $f_{15}$ make SC group #2, subcarriers $f_2$, $f_6$, $f_{10}$ and $f_{14}$ make SC group #3 and subcarriers $f_1$, $f_5$, $f_9$ and $f_{13}$ make SC group #4. Pattern information showing the reporting patterns of these four SC groups is reported from base station 200 to mobile station 100, and group controlling section 107 performs SC group control according to the reporting patterns shown in this pattern information.

Figure 5:
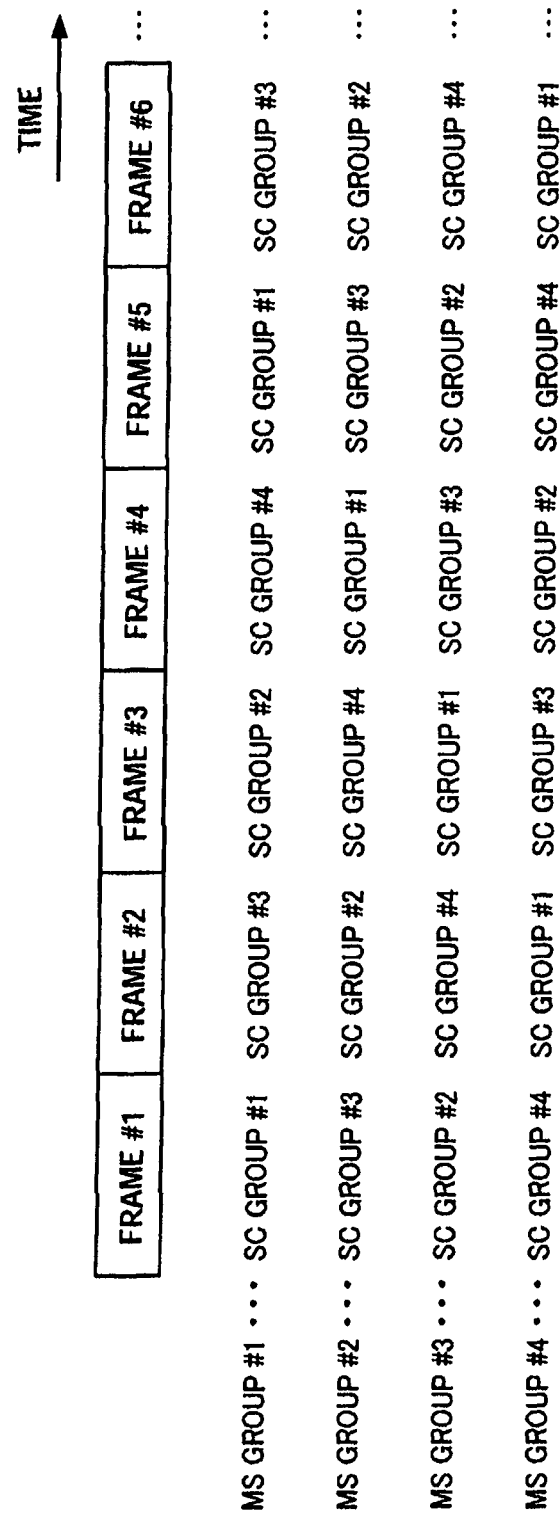
FIG. 5 illustrates an example of reporting patterns according to an embodiment of the present invention.

FIG. 5 shows an example of reporting patterns with SC groups #1 to #4. Pattern information is reported to each mobile station on a per mobile station group basis (i.e. MS group). Here, there are four SC groups, and, to match this, there are four MS groups. Base station 200 classifies each mobile station located in the communication area into one of these four MS groups.

In FIG. 5, focusing upon the reporting pattern for MS group #1, the CQI for subcarriers belonging to SC group #1 is reported in frame #1, the CQI for subcarriers belonging to SC group #3 is reported in frame #2, the CQI for subcarriers belonging to SC group #2 is reported in frame #3, the CQI for subcarriers belonging to SC group #4 is reported in frame #4 and the CQI for subcarriers belonging to SC group #1 is reported again in frame #5. In this way, according to the embodiment, the SC group subject to CQI reporting is changed periodically. By this means, mobile station 100 no longer needs to continue reporting low-level CQI's, so that throughput is improved.

Moreover, according to the embodiment, group controlling section 107 performs SC group control making the reporting periods for SC groups #1 to #4 all uniform. With the examples of reporting patterns shown in FIG. 5, the reporting period is four frames for all SC groups. In this way, by making the reporting periods for all SC groups uniform, the CQI's of individual SC groups are reported equally, and, when one period (here, four frames) has passed, base station 200 is able to perform frequency scheduling using the CQI's of all subcarriers, so that, even when there is a mobile station of high received quality and high priority, frequency scheduling can be performed in accordance with CQI for mobile stations of lower priority, and, consequently, throughput can be further improved.

Moreover, in FIG. 5, when four reporting patterns with respect to MS groups #1 to #4 are compared, the reporting patterns are all different. For example, in frame #1, a mobile station in MS group #1 reports the CQI for SC group #1, a mobile station in MS group #2 reports the CQI for SC group #3, a mobile station in MS group #3 reports the CQI for SC group #2, and a mobile station in MS group #4 reports the CQI for SC group #4. In this way, group controlling section 107 in each mobile station changes the SC group subject to CQI reporting according to a reporting pattern different from the reporting patterns of other mobile stations, thereby preventing a situation where a large number of mobile stations report CQI's for the same subcarriers at the same time. Consequently, subcarriers of good received quality no longer overlap between mobile stations, thereby performing frequency scheduling in base station 200 more effectively.

Moreover, in all reporting patterns in FIG. 5, the SC group subject to CQI reporting is changed in order of SC group #1, SC group #3, SC group #2, SC group #4 and SC group #1, . . . in repetition. Here, focusing upon the grouping shown in FIG. 4, there are no neighboring subcarriers between the SC group #1 and SC group #3 or between the SC group #2 and SC group #4. That is, with the embodiment, group controlling section 107 makes two SC groups that do not contain neighboring subcarriers in a plurality of SC groups subject to reporting continuously. For example, when the number of SC groups is M, the reporting pattern is assumed to be SC group #1, SC group #(M/2+1), SC group #2, SC group #(M/2+2), . . . , SC group # (M/2) and SC group #M. In this way, even a mobile station where frequency selectivity is moderate and where there is little difference in required quality between neighboring subcarriers, no longer continues reporting low-level CQI's, so that throughput is improved.

Next, CQI correction in base station 200 will be described in detail. Here, the reporting pattern for MS group #1 will be described as an example. Accordingly, the CQI reporting pattern from the mobile station (MS) is shown in FIG. 6.

Here, in the event of fading variation, CQI reliability decreases when the interval between the time of generation in mobile station 100 and the time of use in base station 200 is longer. Then, to compensate for decrease of reliability, CQI correcting section 216 in base station 200 corrects a CQI reported from mobile station 100 over time.

Figure 6:
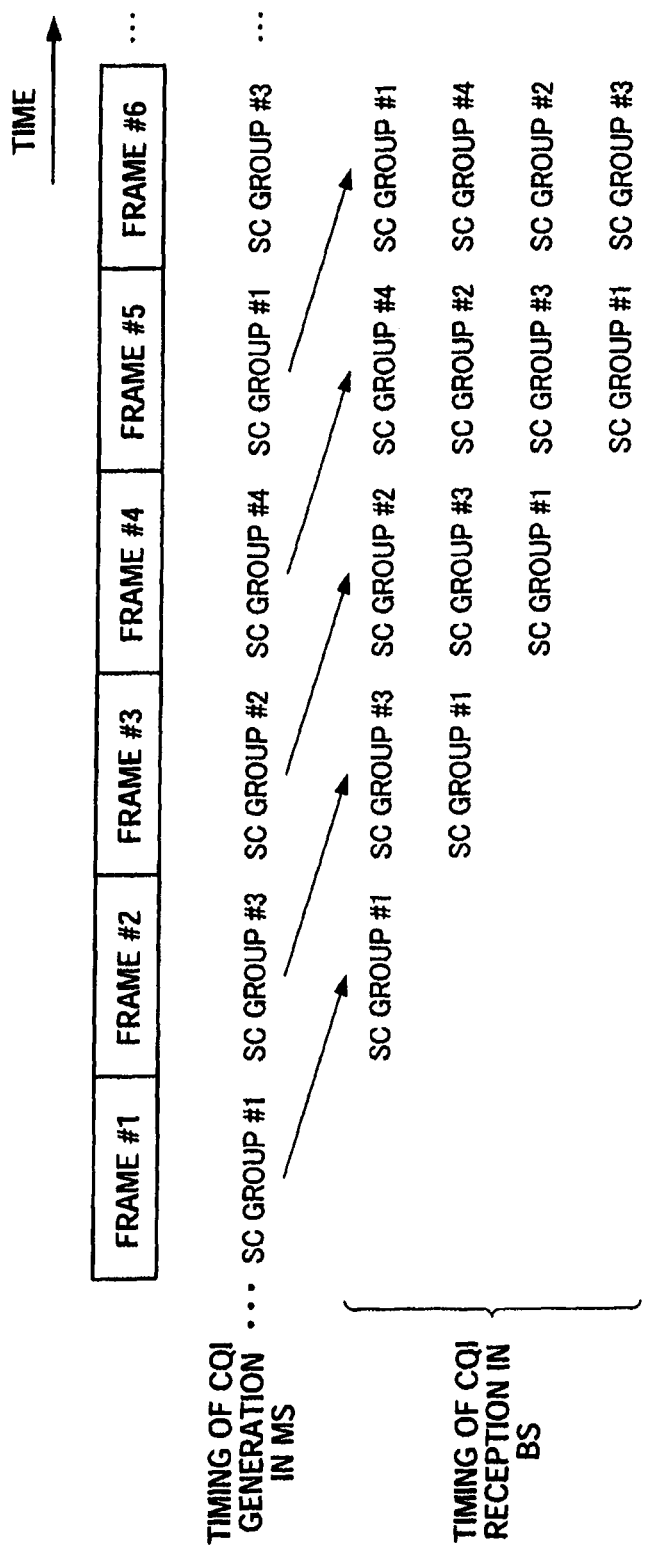
FIG. 6 illustrates CQI generating timings and CQI receiving timings according to an embodiment of the present invention.

More specifically, for example, as shown in FIG. 6, in frame #3, base station (BS) 200 can use the CQI for SC group #1 generated in frame #1 and received in frame #2 and the CQI for SC group #3 generated in frame #2 and received in frame #3. At this time, with reference to the CQI for SC group #1, one frame of time has passed from the time of reception (i.e. frame #2), so that CQI correcting section 216 corrects the CQI level by decrementing one level.

Moreover, in frame #5, base station (BS) 200 can use all CQI's of SC groups #1 to #4, and CQI correcting section 216 corrects by decrementing one level the CQI level of SC group #2 where one frame has passed from the time of reception (i.e. frame #4), corrects by decrementing two levels the CQI level of SC group #3 where two frames have passed from the time of reception (i.e. frame #3), and corrects by decrementing three levels the CQI level of SC group #1 where three frames have passed from the time of reception (i.e. frame #2).

In this way, CQI correcting section 216 makes the amount of the correction of greater for CQI's with longer intervals between the time of reception and the time of use. with reference to the table in FIG. 3, decrementing the CQI level by one level makes transmission rate one grade lower, so that, accordingly, error rate performances can be improved by one grade. Consequently, these corrections make it possible to compensate for decrease of CQI reliability produced over time.

Incidentally, although there are cases where received quality improves by fading variation, with the embodiment, to prevent transmission errors reliably, correction is performed such that the CQI level is decremented to make transmission rate lower. That is, with the embodiment, CQI correcting section 216 corrects a CQI reported from mobile station 100 into a CQI associated with a lower transmission rate.

Moreover, whether CQI correction is performed or not may be switched according to transmitting data types. For example, the above CQI correction may be applied to transmission data with a strict delay requirement such as voice packets, to prevent transmission errors as much as possible, and the above CQI correction may not be applied to transmission data with a moderate delay requirement such as electronic mail data, to increase the transmission rate as much as possible.

Moreover, although CQI correction has been described above such that the CQI level is decremented one level every time one frame passes, the CQI level may be decremented levels matching the rate of channel variation over time due to fading. That is, CQI correcting section 216 may increase the amount of correction with respect to a CQI of faster fading variation, that is, with respect to a CQI reported from a mobile station moving at higher speed. This enables more accurate CQI correction in accordance with the speed of channel variation and furthermore prevents transmission errors.

In this way, according to the embodiment, throughput in multicarrier communications can be improved and transmission errors can be prevented by improving error rate performances.

An embodiment of the present invention has been described.

Incidentally, a mobile station may be referred to as "UE," a base station maybe referred to as "Node-B," and a subcarrier may be referred to as "tone."

Moreover, although a case has been described with the embodiment where frequency scheduling is performed in subcarrier units, frequency scheduling may also be performed in resource block units. Moreover, a resource block may be referred to as a "subchannel," a "subcarrier-block," "subband," or a "chunk." Further, a resource block may be comprised of consecutive subcarriers or nonconsecutive subcarriers.

Moreover, in the above embodiment, CQI is generated based on SINR, but the CQI may be also generated based on SNR, SIR, CINR, received power, interference power, bit error rate, throughput, MCS (Modulation and Coding Scheme) that achieves a predetermined error rate, and so on, instead of SINR. That is, in the present invention, CQI can also be generated based on any of the above parameters showing received quality. Moreover, in the above embodiment, a pilot symbol is used for detecting received quality, but a signal instead of a pilot symbol (e.g. data symbol) may also be used for detecting received quality.

Moreover, in the above embodiment, the CQI is reported on a per frame basis, but the CQI reporting may also be conducted at regular intervals, for example, every three frames.

Moreover, transformations including the DCT transform, are applied to, for example, SINR, and the value after the transformation may also be reported as CQI.

Moreover, in the above embodiment, a SC group is comprised of nonconsecutive subcarriers, but a SC group may be also comprised of consecutive subcarriers.

Moreover, although with the above embodiment a case has been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-238953, filed on Aug. 19, 2005, the entire content of which is expressly incorporated by reference herein.

INDUSTRIAL APPLICABILITY

The present invention is applicable to, for example, mobile communication systems.

The invention claimed is:

1. A base station apparatus comprising:
    a transmitting unit configured to transmit data to a mobile station apparatus using a plurality of subcarriers that are consecutive in a frequency domain, and
    a receiving unit configured to receive a CQI, which is reported from the mobile station apparatus, for each subcarrier (SC) group, the plurality of subcarriers being grouped into multiple SC groups, wherein:
    the CQIs for all of the multiple SC groups are respectively reported in inconsecutive time resources in turn according to a predefined period;
    reporting of the CQI for one of the multiple SC groups is repeated according to a second predefined period that is longer than the predefined period; and
    reporting of the CQI for each of all of the multiple SC groups is repeated, such that the CQI reportings for all of the multiple SC groups, respectively, are repeated according to the same second predefined period.

2. The base station apparatus according to claim 1, wherein the reportings of the CQIs for all of the multiple SC groups are cyclically repeated.

3. The base station apparatus according to claim 1, wherein the SC group for which the CQI is reported is changed according to the predefined period.

4. The base station apparatus according to claim 1, wherein at least two of the CQIs are reported at a predetermined interval.

5. The base station apparatus according to claim 1, wherein at least two of the CQIs are reported per a predetermined number of TTIs.

6. The base station apparatus according to claim 1, wherein the SC group includes a plurality of subcarriers that are consecutive in the frequency domain.

7. The base station apparatus according to claim 1, wherein the SC group includes a plurality of resource blocks, each of which including a plurality of subcarriers that are consecutive in the frequency domain.

8. The base station apparatus according to claim 1, wherein the SC group includes a plurality of subbands, each of which including a plurality of subcarriers that are consecutive in the frequency domain.

9. The base station apparatus according to claim 1 further comprising a transmitting unit configured to transmit information indicative of the predefined period for the CQI reporting, wherein at least two of the CQIs are reported based on the information.

10. The base station apparatus according to claim 1, wherein said receiving unit receives CQIs, which are transmitted from a plurality of mobile station apparatus and which are multiplexed.

11. A method for receiving CQI comprising:
    transmitting data to a mobile station apparatus using a plurality of subcarriers that are consecutive in a frequency domain, and
    receiving a CQI, which is reported from the mobile station apparatus, for each subcarrier (SC) group, the plurality of subcarriers being grouped into multiple SC groups, wherein:
        the CQIs for all of the multiple SC groups are respectively reported in inconsecutive time resources in turn according to a predefined period;
        reporting of the CQI for one of the multiple SC groups is repeated according to a second predefined period that is longer than the predefined period; and
        reporting of the CQI for each of all of the multiple SC groups is repeated, such that the CQI reportings for all of the multiple SC groups, respectively, are repeated according to the same second predefined period.

* * * * *